United States Patent
Rupp et al.

(10) Patent No.: US 6,895,931 B2
(45) Date of Patent: May 24, 2005

(54) METHOD OF DETERMINING THE CRANKSHAFT POSITION OF AN INTERNAL COMBUSTION ENGINE

(75) Inventors: Ingolf Rupp, Kornwestheim (DE); Michael Lehner, Muehlacker (DE); Elmar Pietsch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 10/356,851

(22) Filed: Feb. 3, 2003

(65) Prior Publication Data

US 2003/0168044 A1 Sep. 11, 2003

(30) Foreign Application Priority Data

Feb. 1, 2002 (DE) ......................................... 102 04 196

(51) Int. Cl.[7] ................................................. F02P 5/00
(52) U.S. Cl. ............................. 123/406.18; 123/406.62
(58) Field of Search ....................... 123/406.18, 406.62; 701/102, 107

(56) References Cited

U.S. PATENT DOCUMENTS

| | | | | |
|---|---|---|---|---|
| 5,209,202 A | * | 5/1993 | Maurer et al. | 123/406.18 |
| 5,269,274 A | * | 12/1993 | Flaetgen et al. | 123/406.62 |
| 5,469,823 A | * | 11/1995 | Ott et al. | 123/406.62 |
| 5,622,153 A | * | 4/1997 | Ott et al. | 123/476 |
| 5,671,145 A | * | 9/1997 | Krebs et al. | 701/102 |
| 6,578,550 B1 | * | 6/2003 | Rupp et al. | 123/406.13 |

FOREIGN PATENT DOCUMENTS

DE           43 13 331          10/1994

* cited by examiner

*Primary Examiner*—Mahmoud Gimie
(74) *Attorney, Agent, or Firm*—Kenyon & Kenyon

(57) ABSTRACT

A method for determining the crankshaft position of an internal combustion engine is described with which, in the event of failure of the crankshaft sensor, the crankshaft position may be determined with relative precision at all times. For this purpose, the camshaft position is continuously detected by an absolute angle sensor, preferably in a defined time grid. By analyzing the camshaft positions detected in that way, a value for the instantaneous crankshaft position is determined.

12 Claims, 1 Drawing Sheet

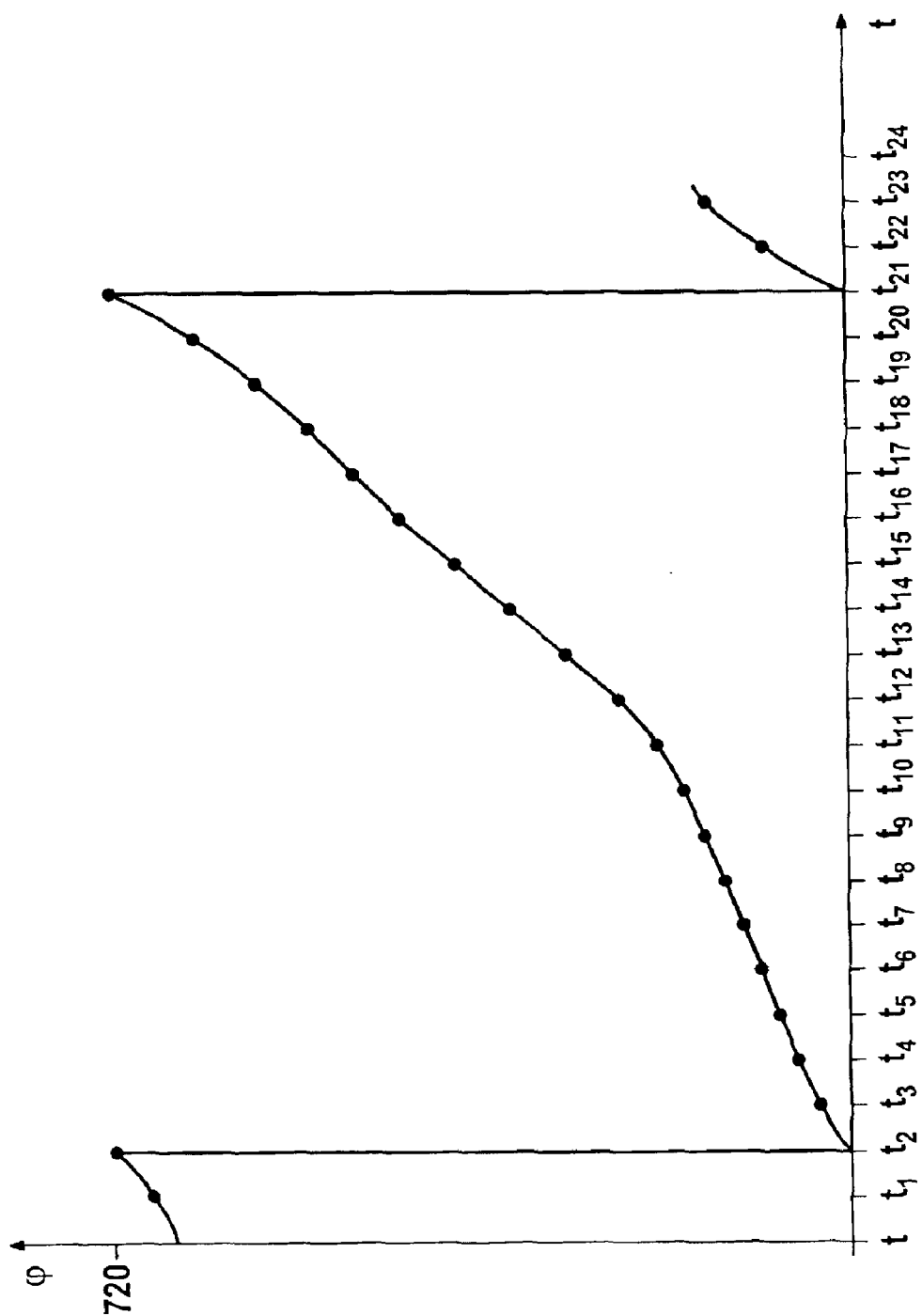

METHOD OF DETERMINING THE CRANKSHAFT POSITION OF AN INTERNAL COMBUSTION ENGINE

FIELD OF THE INVENTION

The present invention relates to a method of determining the crankshaft position of an internal combustion engine in the event of failure of the crankshaft sensor, a value for the instantaneous crankshaft position being identified by analyzing the camshaft position detected by a camshaft sensor.

An emergency running function for the synchronization of engine and engine control may be implemented using such a method.

BACKGROUND INFORMATION

In German Published Patent Application No. 43 13 331, the camshaft position is detected here using a sensor wheel, which is permanently attached to the camshaft, and a camshaft sensor. The sensor wheel is provided with a reference mark which rotates with the sensor wheel and thus with the camshaft. With each revolution of the reference mark, the camshaft sensor emits a signal corresponding to a specific angular position of the camshaft. Accordingly, the camshaft position is only precisely determinable at the points in time of signal emission, i.e., only when the reference mark passes by the camshaft sensor. Since the rotational movements of crankshaft and camshaft are coupled, in the event of failure of the crankshaft sensor the crankshaft position is determined or estimated on the basis of the angular positions detected by the camshaft sensor. Only if the camshaft position can be precisely determined can the crankshaft position also be precisely determined. Between the individual angular positions detected by the camshaft sensor, the crankshaft position is estimated via extrapolation from the previously detected angular positions of the camshaft. Therefore, taking into account the gear transmission ratio between crankshaft and camshaft, an extrapolation over 180° of crankshaft angle takes place here.

For lack of space, the sensor wheel attached to the camshaft is relatively small so that the number of reference marks situated on the sensor wheel may not be significantly increased. Moreover, the maximum number of the reference marks is limited by the resolution capability of the camshaft sensor. Overall, as a rule, the resolution of the camshaft sensor signal is much lower than the resolution of the crankshaft sensor signal. Due to this fact, the method described in German Published Patent Application No. 43 13 331 for determining the crankshaft position of an engine in the event of failure of the crankshaft sensor has been found problematic. In particular in the lower speed range and during starting acceleration, the crankshaft rotation is subjected to relatively high dynamics which may not be detected by the camshaft sensor with sufficient precision. In the event of failure of the crankshaft sensor, very large angular errors may thus occur in determining the crankshaft position, which in turn may have adverse effects on the starting and driving performance of the vehicle. In an extreme case, the large firing angle errors may even cause critical operating conditions for individual engine components.

SUMMARY OF THE INVENTION

An object of the present invention is to provide a method in which the crankshaft position may be precisely determined at all times in the event of failure of the crankshaft sensor.

This is achieved, according to the present invention, by continuously detecting the camshaft position using an absolute angle sensor.

It is recognized, according to the present invention, that it is possible to create a robust emergency running operation in the event of failure of the crankshaft sensor if the camshaft position is continuously detected by using an absolute angle sensor on the camshaft. The camshaft position is advantageously detected in a defined time grid. Having an adequately high resolution of the absolute angle sensor signal over time, a reliable emergency running operation may be ensured, in particular in the lower speed range. As mentioned above, the relative dynamics of the crankshaft rotation are highest at low speed. Since the rotational speed of the crankshaft and therefore also of the camshaft is relatively low in these cases, the absolute angle sensor detects relatively many angular positions of the camshaft during each revolution, which precisely reflect the dynamics of the rotational movement. The relative dynamics are lower at higher speeds, so that in this speed range the dynamics of the rotation may be reflected with sufficient precision by a smaller number of angular positions detected. In the event of failure of the crankshaft sensor, the crankshaft position may thus very well be determined by using the method according to the present invention, i.e., with a small angular error if the crankshaft position is to be extrapolated from the camshaft positions detected. In addition, the method according to the present invention facilitates the synchronization of the engine and the engine controller in any angular position of the camshaft, so that no significant delays occur during starting acceleration even in the event of failure of the crankshaft sensor.

In a possible variant of the method according to the present invention, for each camshaft position detected, a value is determined for the corresponding crankshaft position. A value for the instantaneous crankshaft position may be easily determined by extrapolation of the crankshaft positions so determined.

The measured value acquisition of absolute angle sensors is as a rule temperature- and pressure-dependent, so that the measuring signal of the absolute angle sensor is often subject to errors due to the operation of the engine. During normal operation of the engine, the angular error $\Delta\phi$ may be identified for each angular position of the camshaft on the basis of the crankshaft sensor signal, for example. In the method according to the present invention, this angular error $\Delta\phi$ of the absolute angle sensor is considered in an advantageous manner as a correction value in determining the value for the instantaneous crankshaft position.

In the method according to the present invention, the extrapolation may basically be performed in different ways. In a simplest variant, only those crankshaft positions are considered which have been initially determined from the camshaft positions detected by the absolute angle sensor. The result of the extrapolation may be improved by additionally considering the instantaneous angle speed $\omega$ of the crankshaft which, for example, may be easily estimated on the basis of the angle traveled within a particular time interval. The result of the extrapolation may be further improved by also considering the dynamics $\Delta\omega$ of the crankshaft rotation in determining the value of the instantaneous crankshaft position.

BRIEF DESCRIPTION OF THE DRAWING

The FIGURE shows a diagram depicting the angular position of the crankshaft, determined by the method according to the present invention, in the time grid of the camshaft position detection.

DETAILED DESCRIPTION

A sensor wheel having (60-2) or (36-2) angle marks in the form of teeth is frequently used in practice for the rotational speed detection at the crankshaft. This sensor wheel is permanently attached to the crankshaft, thus rotating with it. The angle marks are scanned by a crankshaft sensor which, for example, operates inductively, magnetoresistively, or utilizes the Hall effect. Each angle mark of the sensor wheel thus represents a defined crankshaft position. The output signal of the crankshaft sensor is transformed into a square-wave signal, each rectangular pulse reflecting the appearance of an angle mark and thus a defined crankshaft position. During normal operation, the ignition and injection operations are triggered as a function of the crankshaft position and the speed with which the crankshaft rotates. For this purpose, the angle marks detected by the crankshaft sensor are counted. The ignition and injection operations are then triggered as a function of the counter reading.

In order to keep the intervention into the overall engine control system as small as possible, in the event of failure of the crankshaft sensor an emergency run is initiated in which the output signal of the crankshaft sensor or the corresponding square-wave signal is simulated by using the information detected by a camshaft sensor. The interrupts triggered via the output signal of the crankshaft sensor in normal operation are triggered via a software "emergency running function". An extrapolated tooth time is used as a basis, i.e., a time interval between the square-wave pulses to be counted is extrapolated from the immediate past. The extrapolated tooth time is updated on the basis of the information detected by the camshaft sensor.

In the method according to the present invention, an absolute angle sensor is used as the camshaft sensor using which the camshaft position is continuously detected, in this case in a defined time grid. Due to the information of the absolute angle sensor obtained in this way, the tooth time between the simulated square-wave pulses may be determined with great precision during the emergency run and in particular may also be updated in the time grid of the absolute angle sensor, so that only minor angular errors occur in determining the crankshaft position. For each camshaft position detected by the absolute angle sensor, a value for the corresponding crankshaft position is determined. The presence of a defined crankshaft position which equals one angle mark is determined by extrapolation of the crankshaft positions so determined. A correction value $\Delta\phi$ which, during normal operation, has been detected as an angular error of the absolute angle sensor is advantageously considered.

This approach is illustrated in the diagram depicted in the sole FIGURE. The t-axis depicts the time grid in which the camshaft position is detected or scanned, using the absolute angle sensor. The engine angular position is depicted on the $\phi$-axis in degrees crankshaft position. The crankshaft positions corresponding to the camshaft positions detected by the absolute angle sensor are plotted as measuring points •. This diagram illustrates that due to the defined time grid more measuring points are detected in the lower speed range than in the higher speed range so that the relative dynamics of the rotation are also properly detected. The measuring points • are connected by an extrapolated curve from which the defined crankshaft positions may be obtained. A point of discontinuity which represents the transition of the engine into the new operating cycle appears at scan times t2 and t21.

As mentioned above, the quality of the output signal of the crankshaft sensor, simulated during the emergency run, is essentially a function of the tooth time on which the simulation is based; the tooth time, however, may always only be estimated or extrapolated from the preceding measured values. It is advantageous that in addition to the crankshaft positions corresponding to the detected camshaft positions, the instantaneous angular speed $\omega$ of the crankshaft is also considered in the extrapolation. For example, a relatively instantaneous angle speed $\omega$ may be determined based on the angle traveled within a particular time interval, e.g., within the last time interval between the detection of two camshaft positions. It is additionally advantageous if the dynamics $\Delta\omega$ of the crankshaft rotation are considered in the extrapolation for determining the defined crankshaft positions or the value for the instantaneous tooth time. For example, information from other sensors in addition to the information from the absolute angle sensor may also be used for determining this variable. Therefore, the method according to the present invention facilitates the update of the tooth time as a function of the particular correction value $\Delta\phi$, the instantaneous angle speed $\omega$ and/or the instantaneous dynamics evaluation $\Delta\omega$.

$$\text{Tooth time}=f(\Delta\phi,\omega, \Delta\omega)$$

In addition, in the event of failure of the crankshaft sensor, the engine controller may be instantaneously synchronized using the method according to the present invention, i.e., independently of the instantaneous crankshaft position and the instantaneous camshaft position. For this purpose, the particular counter is simply set on the instantaneous angular position supplied by the absolute angle sensor.

Alternatively, the tooth interrupts may also be triggered directly by a capture compare unit if the signal of the absolute angle sensor is present as a voltage that is proportional to the detected angular position of the camshaft. The capture compare unit is loaded with the appropriate next voltage value, i.e., the voltage value which corresponds to the next angular position.

What is claimed is:

1. A method of determining a crankshaft position of an internal combustion engine in the event of a failure of a crankshaft sensor, comprising:
   causing a camshaft sensor including an absolute angle sensor to continuously detect a camshaft position; and
   determining an instantaneous value for the crankshaft position by analyzing the camshaft position detected by the camshaft sensor;
   wherein:
   the camshaft position is detected in a defined time grid; and
   for each camshaft position detected, a value for the corresponding crankshaft position is determined, and the instantaneous value for the crankshaft position is determined by extrapolation.

2. The method as recited in claim 1, wherein:
   a correction value $\Delta\phi$, which has been ascertained as an angular error of the absolute angle sensor during normal operation, is considered for determining the instantaneous value for the crankshaft position.

3. The method as recited in claim 1, wherein:
   an instantaneous angular speed $\omega$ of a crankshaft is considered in determining the instantaneous value of the crankshaft position by extrapolation.

4. The method as recited in claim 3, further comprising:
   determining an instantaneous value for the angular speed $\omega$ of the crankshaft on the basis of an angle traveled within a particular time interval.

5. The method as recited in claim 1, wherein:

a dynamics $\Delta\omega$ of a rotation of a crankshaft are considered for determining the instantaneous value for the crankshaft position by extrapolation.

6. A method of triggering events which are dependent on a crankshaft position, comprising:

detecting the crankshaft position in normal operation by a crankshaft sensor which senses angle marks of a sensor wheel that is permanently attached to a crankshaft and rotates therewith, so that each angle mark corresponds to a defined crankshaft position;

triggering the events in normal operation as a function of a number of angle marks sensed by the crankshaft sensor, the events being triggered as a function of the crankshaft position and a speed at which the crankshaft rotates; and starting an emergency run in the event of a failure of the crankshaft sensor, during which an output signal of the crankshaft sensor is simulated using information recorded by a camshaft sensor, wherein:

an absolute angle sensor is used as the camshaft sensor to continuously detect in a time grid camshaft positions, for each camshaft position detected, a value for the corresponding crankshaft position is determined during the emergency run, and during the emergency run, a presence of a defined value for the crankshaft position, representing one of the angle marks, is determined by extrapolation of those crankshaft positions that have been determined on the basis of the detected camshaft positions.

7. The method as recited in claim 6, wherein:

the triggering events relate to triggering firing events and triggering injection events.

8. The method as recited in claim 6, wherein:

a correction value $\Delta\phi$, which has been determined as an angular error of the absolute angle sensor in normal operation, is considered for determining a presence of the crankshaft position, representing one of the angle marks.

9. The method as recited in claim 6, wherein:

an instantaneous angular speed $\omega$ of the crankshaft is considered in determining the crankshaft position by extrapolation.

10. The method as recited in claim 9, wherein:

a value for the instantaneous angular speed $\omega$ of the crankshaft is determined on the basis of an angle traveled within a particular time interval.

11. The method as recited in claim 6, wherein:

a dynamics $\Delta\omega$ of a rotational movement of the crankshaft are considered in determining the crankshaft position by extrapolation.

12. The method as recited in claim 11, wherein:

during the emergency run a time interval between an appearance of two crankshaft positions, defined by consecutive angle marks, is updated as a function of at least one of a particular correction value $\Delta\phi$, an instantaneous angular speed $\omega$, and the dynamics $\Delta\omega$.

* * * * *